Nov. 28, 1967  M. M. HASHA  3,355,189
SAFETY JOINT
Filed Feb. 5, 1965  2 Sheets-Sheet 1
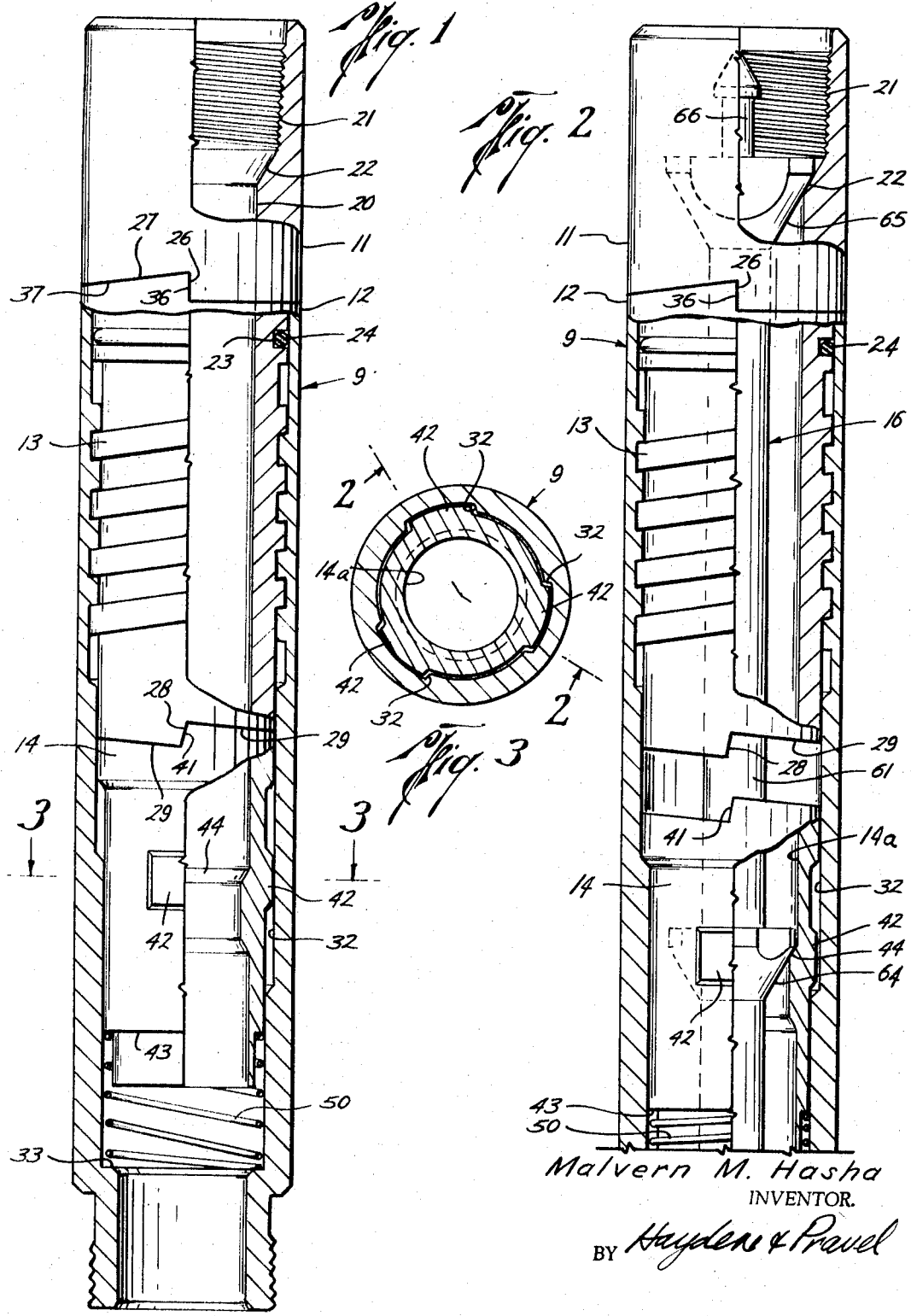
Malvern M. Hasha
INVENTOR.
BY Hayden & Pravel
ATTORNEYS

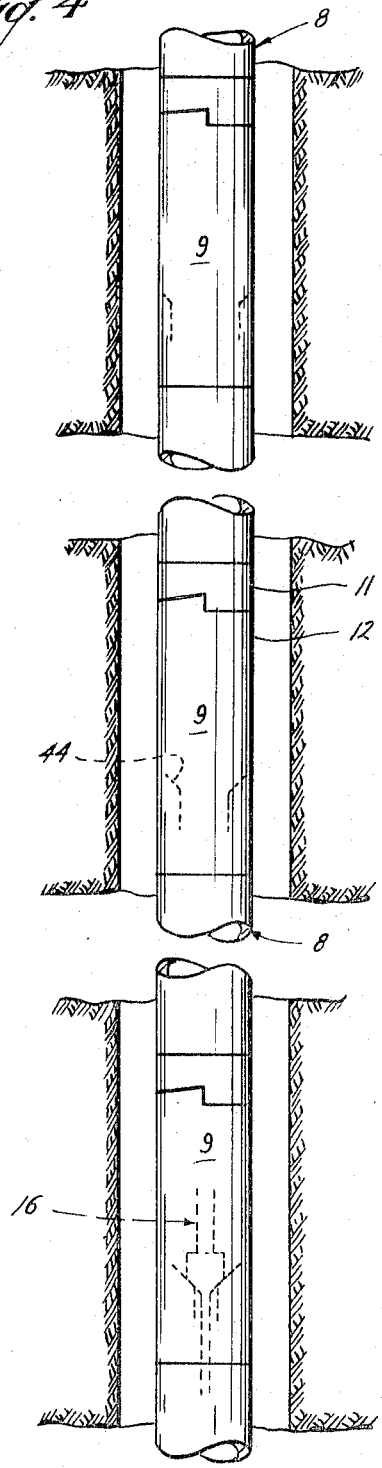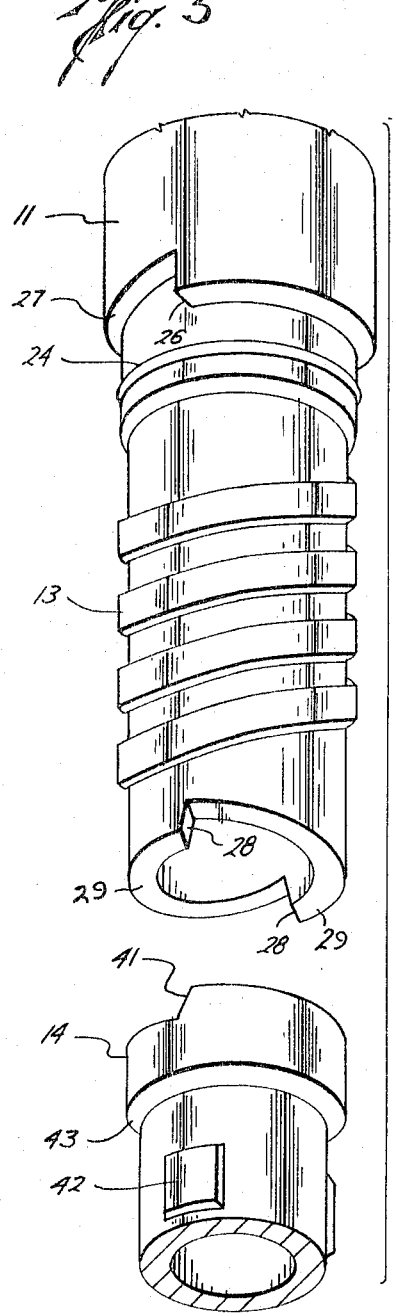

United States Patent Office 3,355,189
Patented Nov. 28, 1967

3,355,189
SAFETY JOINT
Malvern M. Hasha, 414 South Coast Bldg.,
Houston, Tex. 77002
Filed Feb. 5, 1965, Ser. No. 430,716
1 Claim. (Cl. 285—36)

The present invention relates to new and useful improvements in safety joints and, more particularly, to safety joints for quickly and easily connecting tubular members together, which, when connected, may be subjected to torque in either direction about their longitudinal axis or which may be subjected to longitudinal forces in either direction along their longitudinal axis without becoming disconnected, and yet which may be quickly and easily disconnected in a well when desired.

The various types of safety joints provided heretofore have certain defects or disadvantages which the safety joint of this invention eliminates or overcomes. For instance, safety joints employing J-slot quick release connections are susceptible to becoming accidentally disconnected, particularly when the well or hole in which they are used has frequent or severe bends or curves which engage the pipe and restrict its movement. Also, when used in a drill string, the J-slot type safety joint may become accidentally disconnected during drilling operations.

Furthermore, although the pin type safety joints which employ a shear pin release mechanism are seldom accidentally disconnected in use, they must be entirely withdrawn from the hole in order to replace the pin which is sheared each time the safety joint is disconnected.

There are other types of safety joints which employ quick release threads which, while not being particularly susceptible to becoming accidentally disconnected and having the facility for being quickly and easily disconnected and reconnected without withdrawing the string of pipe from the hole, yet which transmit torque in only one direction about their longitudinal axis, as they become easily disconnected when torque is applied in the opposite direction.

Therefore it is an object of the present invention to provide a new and improved safety joint which may be easily disconnected as well as reconnected in a well and which, when connected, will transmit torque in either direction about the longitudinal axis of the string of pipe in which such safety joints are used.

Another object of the present invention is to provide a new and improved safety joint for quickly and easily disconnecting and reconnecting a string of pipe in a well and which safety joint may be rotated in either direction about its longitudinal axis and which may also be subjected to longitudinal forces in either direction along its longitudinal axis without becoming disconnected.

Still another object of the present invention is to provide a new and improved safety joint for use in a string of pipe which is adapted to transmit full torque in either direction about the longitudinal axis of such pipe without becoming accidentally disconnected and yet, which may be quickly and easily disconnected and reconnected in a well hole.

Another object of the present invention is to provide a new and improved safety joint for use in a string of pipe including a male member and a female member adapted to be connected together wherein such female member includes a pawl for engaging a ratchet on said male member to lock said male member and said female member together, and a release plunger for disengaging said pawl from said ratchet to permit such male and female members to be disconnected when desired.

And yet another object of the present invention is to provide a new and improved type of safety joint constructed and arranged to enable a plurality of such safety joints to be used in a string of pipe, wherein each of such safety joints may be selectively disconnected in the well without disturbing the connections at the other safety joints.

Still another object of the present invention is to provide a plurality of new and improved safety joints for use in a string of pipe wherein each of such safety joints includes a male member and female member adapted to be threadedly connected together wherein a releasable lock mechanism in such female member engages said male member to lock said male and female members against disconnecting rotation relative to each other and, wherein such plurality of safety joints in the string of pipe are graduated in size to enable such safety joint to receive a larger release member than the safety joint immediately therebelow to enable the string of pipe to be disconnected at a preselected safety joint.

Other objects and advantages of the present invention will become readily apparent from a consideration of the following description and drawings, wherein:

FIG. 1 is a longitudinal view, partly in section, of the safety joint of this invention showing the male and female members threaded together with the locking mechanism engaging the male member;

FIG. 2 is also a longitudinal view, partly in section, of the safety joint of this invention with the male and female members threaded together and with a release plunger shown disengaging a locking member from the male member;

FIG. 3 is a sectional view taken along a line 3—3 of FIG. 2 showing details of construction of the locking member;

FIG. 4 is a view, partly in section, showing a plurality of the safety joints of this invention disposed in a string of pipe in a well wherein each of such safety joints is adapted to receive a larger release plunger than the safety joint immediately therebelow; and FIG. 5 is an isometric view showing details of construction of the male member and the locking mechanism of the safety joint of this invention.

The safety joint of the present invention is designated generally at 9 and FIGS. 1 and 2 of the drawings. Such safety joint 9 comprises an upper tubular member 11 and a lower tubular member 12 which have quick release threads 13 for quickly and easily connecting and disconnecting such members 11 and 12 either at the surface, or, as is the more usual case, in a well bore.

In the preferred form of the safety joint of this invention shown in the drawings, the upper tubular member 11 is a male member and the lower tubular member 12 is a female member. A hollow detent member 14 is provided in the female member 12 for forming a ratchet coupling with the male member 11 when such members 11 and 12 are connected together as will be described in more detail hereinafter. Such ratchet coupling enables the members 11 and 12 to be secured together for transmitting torque in either direction about the longitudinal axis of the string of pipe in which such members 11 and 12 are employed without becoming accidentally disconnected and also enables such members to be disconnected and reconnected in the well when desired.

A release plunger designated generally at 16 in FIG. 4 of the drawings is provided for disengaging the detent member 14 from the male member 11 in a manner to be described in detail hereinafter, to enable the members 11 and 12 to be disconnected, when desired.

Considering now the apparatus of the present invention in more detail, the upper tubular member or male member 11, as shown in FIG. 1 of the drawings, has a longitudinally extending passage or bore 20 extending longitudinally therethrough. Standard pipe threads 21 are formed in the upper end of such member 11 for connecting the safety joint 9 of this invention in a string of pipe or tubing or the like, designated generally at 8 in FIG. 4 of the drawings.

An annular surface or shoulder 22 is below the threads 21 for receiving or engaging the release plunger 16 to prevent its passing out of the member 11 accidentally, particularly when such members 11 and 12 are disconnected in a well bore.

In the preferred form of this invention, the upper tubular member 11 also has a circumferentially extending groove or recess 23 above the quick release threads 13 for receiving an O-ring 24, or other suitable seal which is provided for forming a seal between the members 11 and 12 when they are connected together.

As best seen in FIG. 5 of the drawings, the upper tubular member 11 has an upper shoulder or stop 26 formed thereon for engaging a corresponding shoulder 36 at the upper end of the lower tubular member 12 to prevent the quick release threads 13 in the members 11 and 12 from connecting together as tightly as the threaded connections joining the various joints of pipe in the pipe string 8 to enable the quick release threads 13 to be easily disconnected when desired. Also, it will be appreciated that the shoulders 26 and 36, respectively, extend parallel to the longitudinal axis of the upper tubular member 11 and lower tubular member 26, as shown in FIG. 2, and are thus constructed and arranged to transmit torque between the members 11 and 12 when either of such members is rotated in a direction for connecting threads 13.

A helically extending landing or surface 27, having substantially the same lead as the threads 13, is provided on the upper tubular member 11 for engaging a corresponding landing or surface 37 on the lower tubular member 12 to form a closure between the members 11 and 12 when such members are connected together to protect the seal 24 and prevent debris from interfering with the operation of the quick release threads 13.

As best seen in FIGS. 2 and 5 of the drawings, one or more ratchet teeth 28 are provided on the lower end of the male member 11 for engaging pawls 41 on the upper end of the hollow detent member 14, thus forming a ratchet coupling which will be described in more detail hereinafter. As best shown in FIGS. 2 and 3 of the drawings, the hollow detent body 14 has a passage 14a extending longitudinally therethrough which is of sufficient diameter to receive the release plunger 16 in a manner to be described hereinafter. The detent body has a plurality of external longitudinally extending ridges or splines 42 which are received in corresponding recesses or longitudinally extending grooves 32 in the female member 12. The splines 42 are slightly smaller than the width of the grooves 32 to provide a longitudinal clearance therebetween as best seen in FIG. 3 to permit the detent body 14 to be moved longitudinally relative to the body 12 but substantially prevent rotation therebetween.

As shown in the drawings, the teeth 28 on the lower end of male member 11 are inclined relative to the longitudinal axis of the member 11, and the pawls 41 are inclined relative to the longitudinal axis of member 14, said teeth 28 and 41 being inclined, as illustrated in the drawings, whereby their abutting edges are parallel.

In the preferred form of this invention, a coil spring 50 or other suitable type of resilient member is provided for urging the detent body 14 longitudinally upwardly relative to the member 12 and into engagement with the lower end of the upper tubular member 11. As shown, such spring 50 rests on an annular shoulder 33 in the female member 12 and engages an external annular shoulder 43 on the detent body 14. The inclined arrangement of the teeth 28 and pawl 41 enables the spring to maintain the teeth 28 and pawls 41 in abutting relationship and also enables the lands 29 to always abut the edge surface on body 14 opposite lands 29 even if the drill bit should hang up during drilling and cause back torque in the drill string.

As illustrated in the drawings, the quick release threads 13 are right-hand threads. Thus, it will be appreciated that the landings 29, extending between the ratchet teeth 28 have left-hand lead to enable such teeth 28 to ride over the pawls 41 as the members 11 and 12 are threaded together. When the tubular members 11 and 12 comprising the safety joint 9 are threaded completely together, as shown in FIGS. 1 and 2 of the drawings, the upper shoulder 26 engages the corresponding shoulder 36 to transmit torque in one direction of rotation and the ratchet teeth 28 engage the pawls 41 on the nonrotatable detent housing 14 to transmit torque in an opposite direction. Thus, it will be appreciated that with the safety joint 9 of this invention, torque may be transmitted in a string of pipe in either direction about the longitudinal axis of such string of pipe without prematurely or accidentally disengaging the safety joint 9. Also, with safety joint 9, force may be transmitted longitudinally along the string of pipe in either direction without disengaging such safety joint 9.

The release plunger 16, which is provided for disengaging the detent body 14 from the male member 11, preferably includes a longitudinally extending shaft or body 61 having a lower external annular shoulder 64 formed thereon for engaging an internal annular shoulder 44 in the passage 14a of the detent housing 14. In the preferred form of this invention, the annular shoulders 64 and 44, respectively, are inclined upwardly and outwardly to facilitate the placement of the plunger 16 in the detent housing 14. As best seen in FIG. 4 of the drawings, when the release plunger 16 is lowered into the safety joint 9, the annular shoulder 64 engages the shoulder 44 and the release plunger 16 depresses the spring 50 thereby disengaging the pawl 41 from the ratchet teeth 28 and thus allowing the quick release threads 13 to be disconnected upon rotation of the pipe string 8.

An upper annular shoulder 65 which is also inclined upwardly and outwardly is formed near the upper end of the release plunger 16 for engaging the similarly inclined annular shoulder 22 in the male member 11 to prevent the release plunger 16 from falling or dropping out of the member 11 when the members 11 and 12 have been disconnected. Also, in the preferred form of this invention, a fishing neck 66 is provided on the release plunger 16 to enable such plunger to be easily removed or recovered from the string of pipe 8 in which the safety joint is used without requiring that a portion of such string of pipe be removed or withdrawn from the well.

In operation, the safety joint 9 of this invention is made up by connecting the tubular members 11 and 12, respectively, by means of the quick release threads 13. This may be done either at the surface or in the well, as desired. When such members 11 and 12 are being threaded together, the left-hand lead on the landings 29 enables the ratchet teeth 28 on the lower end of the male member 11 to override the pawls 41 and depress the detent body 14 in the member 12 until such members 11 and 12 are completely threaded together as shown in FIG. 2 of the drawings. When thus completely fitted together, the upper shoulder 26 on the male member 11 engages the corresponding upper shoulder 36 on the female member 12 and the ratchet teeth 28 engage the pawls 41, enabling such members 11 and 12 to transmit torque in either direction about their longitudinal axis without becoming disconnected.

Thereafter, when it becomes desirable to disconnect the members 11 and 12, the release plunger 16 is lowered through the pipe or tubing 8 so that the lower annular shoulder 64 engages the corresponding annular shoulder 44 in the detent body 14. The weight of the release plunger 16 depresses the spring 50 and thereby disengages the retaining pawls 41 from the ratchet teeth 28 thus allowing the quick release threads 13 to be disconnected by rotating the upper tubular member 11 in a left-hand direction.

FIG. 4 of the drawings illustrates an alternate arrangement of the apparatus of this invention wherein a plurality of safety joints 9 may be used in a single string of tubing or pipe 8 to enable such string of tubing to be disconnected at any one of a plurality of elevations. As shown in FIG. 4, a string of tubing or pipe 8 includes a plurality of safety joints 9a, 9b, and 9c, respectively, which are disposed at different elevations in the well. Each of such safety joints 9a, 9b, and 9c are substantially identical to the safety joint 9 described hereinabove except that the internal diameter of the passage 14a in each of the safety joints 9a, 9b, and 9c, respectively, is graduated with the largest being arranged at the uppermost elevation in the safety joint 9a and the smallest diameter passage 14a being disposed at the lowermost elevation in the safety joint 9c. Thus, by employing release plungers 16 having various diameter lower shoulders 64, the safety joint at a preselected elevation may be released without disturbing the connections formed by the other safety joints in the pipe thereabove or therebelow.

Broadly, the present invention relates to new and improved safety joints including a releasable ratchet coupling formed therein for providing a safety joint which may be subjected to torque in either direction about its longitudinal axis and/or along its longitudinal axis without becoming accidentally disconnected and which may be quickly and easily disconnected and reconnected in a well when desired.

What is claimed is:

A safety joint comprising:
(a) an upper tubular member,
(b) a lower tubular member,
(c) thread means in each of said members for threadedly connecting said members together,
(d) longitudinally extending opposed shoulders on said upper member and said lower member, respectively, for transmitting torque when said members are connected together,
(e) ratchet means on said upper member below said thread means,
(f) said ratchet means including at least two surfaces which are inclined at an angle relative to the longitudinal axis of said upper member and a circumferential surface extending between said inclined surfaces,
(g) longitudinally movable pawl means in said lower tubular member,
(h) said pawl means including at least two surfaces which are inclined at an angle relative to the longitudinal axis of said movable means and a circumferential surface extending between said inclined surfaces for engaging said inclined surfaces on said ratchet means in said upper member and for engaging the circumferential surfaces of said upper member and movable means when said upper and lower members are connected together to prevent disconnection of said members,
(i) spring means abutting the lower end of said movable means for urging it upwardly whereby said inclined surfaces and said circumferential surfaces of said upper member and longitudinally movable member are always engaged;
(j) shoulder means in said longitudinally movable pawl member for receiving a release member for moving such pawl member longitudinally out of engagement with said ratchet means to allow said thread means to be disconnected; and
(k) shoulder means in said upper member and shoulder means on said release member for engaging with each other whereby said release member may be withdrawn with the upper member when said upper and lower members are disconnected.

References Cited
UNITED STATES PATENTS

| | | | |
|---|---|---|---|
| 1,883,071 | 10/1932 | Stone | 285—83 X |
| 2,118,350 | 5/1938 | Holt | 285—85 X |
| 2,302,856 | 11/1942 | Hamon | 285—84 |
| 2,728,895 | 12/1955 | Quackenbush et al. | 285—85 X |
| 2,836,435 | 5/1958 | Briley | 285—84 |

EDWARD C. ALLEN, *Primary Examiner.*

CARL W. TOMLIN, *Examiner.*

R. G. BERKLEY, *Assistant Examiner.*